Dec. 22, 1959   P. R. DIJKSTERHUIS ET AL   2,918,596
VACUUM TUBE
Filed April 9, 1957

INVENTORS
P. R. DIJKSTERHUIS
A. R. HOVINGH
BY
Frank R. Trifari
AGENT ns # United States Patent Office 2,918,596
Patented Dec. 22, 1959

2,918,596

VACUUM TUBE

Popko Reinder Dijksterhuis and Albertus Remko Hovingh, both of Eindhoven, Netherlands, assignors to North American Philips Company Inc., New York, N.Y., a corporation of Delaware Application April 9, 1957, Serial No. 651,739

3 Claims. (Cl. 313—257)

This invention relates to ceramic vacuum tubes and the like. In particular, it relates to the envelope of such tubes and to methods for manufacturing ceramic vacuum tube envelopes.

One way in which ceramic envelopes are frequently made is by forming a multi-tiered stack of short cylindrical ceramic members interleaved with metallic washer-like members on which the tube elements are mounted and sealing the tiers of the stack together. Usually the flanges of the metallic members extend out beyond the ceramic members so that electrical connections can be made directly to these metallic flanges without the necessity of providing wire leads through the wall of the envelope. Such a structure is well-adapted for use in very small vacuum tubes of the type operated at very high frequencies. However, the closer the spacing between the active tube elements, i.e., the cathode, the grid or grids, and the anode or anodes, the more critical are the spacing tolerances between these elements, and the critical nature of these tolerances is especially evident at very high frequencies.

The present invention contemplates the use of flat-surfaced ceramic and washer-like metallic members as integral parts of a self-jigging structure, the spacing between the internal tube elements being determined during manufacture solely by the thickness of the flanges of the washer-like metallic elements and the ceramic elements interposed therebetween. In order to seal these elements together, annular rings of metal having a lower melting temperature than the metal of which the flanges are made are pressed between what would otherwise be abutting tube envelope members. The annular rings are of metal which has the additional property that, when molten, it dissolves, to some extent, the metal of which the flanges are made. Upon being heated to melting temperature, these annular rings become liquefied and adhere to the abutting ceramic members. Furthermore, the molten annular rings dissolve the contiguous portion of the flanges with the result that each molten annular ring sinks into the contiguous part of the abutting flange, leaving an immediately adjacent annular section of the metallic member undissolved and dimensionally unaffected by the sealing process. Axial pressure on the whole multi-tiered structure forces the ceramic members into face-to-face contact with the undissolved annular sections of the flanges, so that the overall height of the structure is determined only by the thickness of the ceramic members and the original thickness of the flanges, as retained in the undissolved annular portions of the flanges. The molten annular rings do not flow and therefore do not create a metallic film between abutting surfaces of the flanges and ceramic members. Furthermore, there is no need to form a groove in either the ceramic or the flanges to provide room for the molten rings; the molten metal simply goes into the flange metal.

The principal object of the invention is to provide a ceramic tube in which the operating elements will be accurately spaced and the accuracy of the spacing will be determined by self-jigging of the ceramic member and metallic washer-like members of the tube envelope.

Ancillary objects will appear after a study of the following specification together with the drawings in which.

Figures 1, 2:
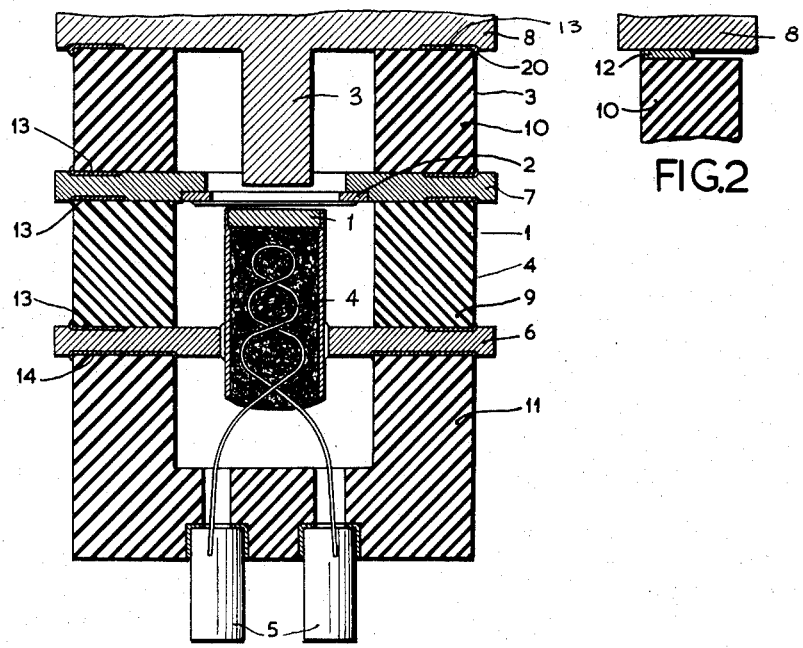
Fig. 1 is a cross sectional view of one embodiment of a ceramic vacuum tube incorporating the invention.
Fig. 2 shows an initial step in the fabrication of a section of the envelope of the embodiment in Fig. 1.

The tube in Fig. 1 comprises a cathode 1 which may be a dispenser type of cathode, a control grid 2 comprising an annular disc the aperture of which is crossed by a number of very fine wires, and an anode 3 which in this embodiment consists of a solid metallic post extending into the tube in the vicinity of the grid 2. The cathode is heated by means of a heater 4 which is connected to a pair of contact studs 5.

The cathode 1 is supported by means of a metallic flange 6 which is welded or otherwise secured to the cathode at a precisely determined distance from the emitting surface thereof. Similarly, the annular ring of the grid 2 embedded in a recess of a flange 7, the thickness of which is also precisely determined as in the distance between the plane of the wires and the plane in which the surface of flange 7 lies. The anode post 3 extends a precisely pre-determined distance from the lower surface of a flange 8. The remainder of the self-jigging structure consists of two short pieces of ceramic tubing 9 and 10. The lengths of these pieces of tubing are also precisely determined so that the spacings between the emitting surface of cathode 1 and the wires of the grid 2 and the end of the anode 3 are acurately determined. The lower end of the envelope is closed by a ceramic member 11 to which the contact studs 5 are sealed.

The method of forming the ceramic envelope will now be described by referring first to Fig. 2 which shows only the upper left hand corner of the tube envelope of Fig. 1. It will be seen in Fig. 2 that the upper side of the ceramic tubing 10 is flat with no grooves in it and that the lower surface of flange 8 is also flat. Flat surfaces such as these are, of course, easier to manufacture than would be surfaces with grooves built into them. It has been thought heretofore that grooves would be necessary to provide room for the sealing material, but I have discovered that such is not the case. I simply place an annular metal ring 12, preferably of silver foil, between the upper surface of the ceramic member 10, which is preferably alundum ($Al_2O_3$) or forsterite ($2MgO.SiO_2$), and the lower surface of the flange 8 which is preferably titanium or zirconium. Besides silver, other materials which may be used for foil 12 include gold, copper, nickel, iron, cobalt, or manganese. Similar foil rings are placed between the other elements of the envelope and the whole thing is then heated in vacuum until the annular foil rings melt. When this happens, the molten metal of the foils does not flow appreciably across the surface of the ceramic but merely dissolves a small portion of the contiguous zirconium or titanium surface of the flanges so that this surface is sealed to the adjacent ceramic in a vacuum tight joint. Referring again to Fig. 1, it will be noticed that the molten annular rings 13 remain almost exactly in the same positions as the foils 12 of Fig. 2 and do not flow completely across the surface of the ceramic member.

Thus, there is at least an annular section of each of the flanges 6, 7 and 8 which is not dissolved and which retains its original dimensions, thereby allowing it to act as a thickness jig. No such precautions need be taken with the seal 14 at the lower surface of flange 6 because there is nothing critical about the spacing between the ceramic member 11 and the flange 6, and the sealing foil can therefore extend across the sealing surface, as shown. It has been found that excess molten material, if there is any, is forced out from between the metal flanges and the ceramic members as indicated by reference character 20, instead of flowing across the surface of the ceramic.

Due to the fact that during heating of the structure the metal of which the flanges 6–8 are formed is dissolved in the annular foil 12, a eutectic is initially formed so that melting occurs. However, the melting point of the alloy rises as more of the flange metal is dissolved, so that the joints 13 and 14 automatically become solidified during the heating.

Figures 3, 4:
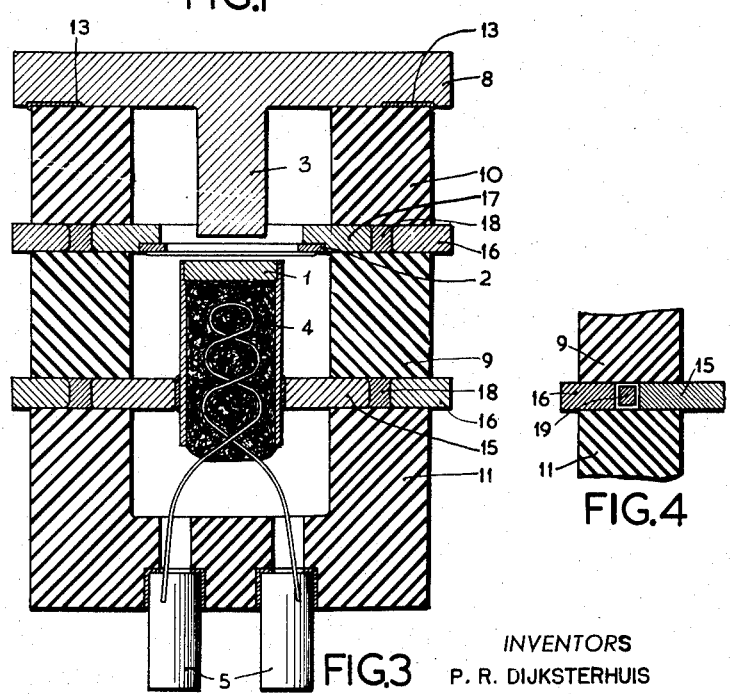
Fig. 3 shows a cross sectional view of this embodiment of a tube incorporating the invention.
Fig. 4 shows a step in the fabrication of a portion of the embodiment in Fig. 3.

In the embodiments shown in Figs. 3 and 4, the flanges 15 and 17 have smaller diameters than the ceramic members 9–11. When they are stacked together a ring 19 (Fig. 4) which may be of silver or copper, is placed around the flanges 15 and 17 and is itself encircled by an outer ring 16 which is preferably of the same metal and with the same thickness as the flanges 15 and 17.

Upon being heated, the structure is sealed in much the same way as the structures in Figs. 1 and 2. The rings 19 become molten and adhere to the ceramic members and also dissolve contiguous parts of the flanges 15 and 16 or 16 and 17 so that the resultant structure as shown in Fig. 3 includes a solidified ring 18 which is sealed to all adjacent members. The dimensional accuracy of this structure is maintained by the undissolved portions of flanges 15 and 17 and the rings 16, as in the case of the structure of Fig. 1.

While this invention has been described in connection with only two embodiments, it will be appreciated by those skilled in the art that other embodiments are equally suitable within the scope of the invention as defined by the following claims.

What is claimed is:

1. A vacuum tube structure comprising first and second electrodes, first and second metallic flanges supporting said electrodes respectively, said flanges having flat surfaces facing each other, a ceramic spacer member having parallel flat surfaces on opposite sides, one of said flat surfaces of said ceramic member abutting and being sealed to one of the flat surfaces of said first flange and the other of said flat surfaces of said ceramic member abutting and being sealed to the flat surface of said second flange; and sealing material between said ceramic member and said flanges for sealing said ceramic member to said flanges, the area covered by said material being less than the total surface contact area between said members, said sealing material comprising metal which melts at a lower temperature than the metal of said flanges and which when molten dissolves the metal of said flanges.

2. The structure of claim 1 in which said flanges are constituted of an element selected from the group consisting of titanium and zirconium and said sealing material is composed of an element selected from the group consisting of silver, copper, gold, cobalt, iron, nickel and manganese.

3. A vacuum tube envelope comprising a multi-tiered structure comprising alternate short lengths of ceramic tubing and washer-like metallic flanges, said flanges being parallel to each other and at least a first and a second one of said flanges having flat surfaces facing each other and being spaced apart by a precisely pre-determined distance, said multi-tiered structure being sealed together into a vacuum-tight envelope by seals between abutting metallic flanges and ceramic members; one of said lengths of ceramic tube between said first and said second one of said flanges having flat surfaces at each end with one of said surfaces abutting said first flange and the other of said surfaces abutting said second flange, the length of said tubing being equal to said precisely determined distance, the seal between said first flange and the abutting surface of said length of ceramic tubing comprising a closed annular ring of sealing material adjacent the outer edge of the surface of said ceramic tubing and covering an area less than the total surface contact area between said ceramic tube and said flange, said material comprising a metal which melts at a lower temperature than the metal of said first flange and which when molten seals to said ceramic tubing and dissolves the contiguous portion of said first flange; the seal between the other end of said length of ceramic tubing and said second one of said flanges comprising an annular ring of sealing material around the outer edge of said ceramic tubing, said sealing material comprising a metal having a lower melting temperature than the metal of said second one of said flanges and having the property when molten of dissolving the metal of said second one of said flanges.

References Cited in the file of this patent

UNITED STATES PATENTS 2,163,407    Pulfrich    June 30, 1939

FOREIGN PATENTS 167,268    Austria    Dec. 11, 1950